(12) United States Patent
Tyree et al.

(10) Patent No.: US 8,856,315 B2
(45) Date of Patent: Oct. 7, 2014

(54) DEVICE CLASSIFICATION SYSTEM

(75) Inventors: David S. Tyree, Centreville, VA (US); James E. Tomlinson, Falls Church, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1047 days.

(21) Appl. No.: 12/474,419

(22) Filed: May 29, 2009

(65) Prior Publication Data

US 2010/0305990 A1    Dec. 2, 2010

(51) Int. Cl.
*G06F 15/173* (2006.01)
*G06F 11/00* (2006.01)
*G06Q 10/06* (2012.01)

(52) U.S. Cl.
CPC ............ *G06Q 10/06* (2013.01); *G06Q 10/0637* (2013.01)
USPC .............................................. 709/224; 726/25

(58) Field of Classification Search
CPC .............. H04L 63/1433; G06Q 10/06; G06Q 10/0635; G06Q 10/0637; G06Q 10/067
USPC ................ 709/224–227; 705/7.28–7.33; 726/22–26
See application file for complete search history.

(56) References Cited

U.S. PATENT DOCUMENTS

| | | | |
|---|---|---|---|
| 7,593,859 B1 * | 9/2009 | Owens et al. | 705/7.28 |
| 7,752,125 B1 * | 7/2010 | Kothari et al. | 705/38 |
| 8,010,447 B2 * | 8/2011 | Hurley et al. | 705/38 |
| 8,091,065 B2 * | 1/2012 | Mir et al. | 717/104 |
| 8,438,643 B2 * | 5/2013 | Wiemer et al. | 726/25 |
| 2005/0160480 A1 * | 7/2005 | Birt et al. | 726/25 |
| 2005/0177746 A1 * | 8/2005 | Bunn et al. | 713/201 |
| 2006/0149574 A1 * | 7/2006 | Bradley et al. | 705/1 |
| 2007/0060136 A1 * | 3/2007 | Ramer et al. | 455/445 |
| 2007/0143851 A1 * | 6/2007 | Nicodemus et al. | 726/25 |
| 2008/0049642 A1 * | 2/2008 | Gudipudi et al. | 370/254 |
| 2008/0222631 A1 * | 9/2008 | Bhatia et al. | 717/178 |
| 2009/0007269 A1 * | 1/2009 | Bianco | 726/25 |
| 2009/0024425 A1 * | 1/2009 | Calvert | 705/7 |
| 2009/0037594 A1 * | 2/2009 | Sever et al. | 709/230 |
| 2009/0099885 A1 * | 4/2009 | Sung et al. | 705/7 |

* cited by examiner

Primary Examiner — Chirag R Patel

(57) ABSTRACT

Systems and/or methods include obtaining device information for devices within a network and determining a business function for each of the devices. The systems and/or methods further include assigning a criticality score to each of the devices based on the determined business function and generating a report for the devices based on the determined business function and the assigned criticality score.

21 Claims, 8 Drawing Sheets

| 400 | | | |
|---|---|---|---|
| 410 — Device IP Address: 192.168.10.77 | | | |
| 420 — Operating System: Cisco | | | |
| 430 — Applications | | | Interface (440) |
| 450 | Cisco SSH | SSH | TCP 22 | Telnet Available | TCP 23 |
| | Cisco Telnet | Telnet | TCP 23 | SSH Protocol Available | TCP 22 |
| | HTTP Server | ? | TCP 443 | HTTP Available | TCP 443 |
| | ... | | | | |
| | SSLv3 | ? | TCP 443 | SSHv1 Protocol Available | TCP 22 |
| 460 — Profile Tags: ? | | | |

FIG. 4

```xml
<classifier name="HTTP webservers">
<!-- Identify Standard common Webservers...-->
<and>
    <or>
        <app-child-of name="Microsoft IIS HTTP" />
        <app-child-of name="Microsoft IIS HTTP 5.x" />
        <app-child-of name="Microsoft IIS HTTP 4.x" />
        <app parent="Apache HTTP" port="tcp:80"/>
        <app parent="Apache HTTP" port="tcp:443"/>
        <app parent="SSL" port="tcp:443"/>
        <app-child-of name="Netscape / iPlanet / SunONE / NetWare Enterprise and Netscape FastTrack HTTP" />
    </or>
    <not>
        <or>
            <has-tag tag="Printer"/>
            <has-tag tag="Router" />
            <has-tag tag="Firewall"/>
            <has-tag tag="Desktop_Laptop_Workstation"/>
            <has-tag tag="Exchange_Secure_Mail"/>
        </or>
    </not>
</and>
<add-tag tag="webserver" />
</classifier>
```

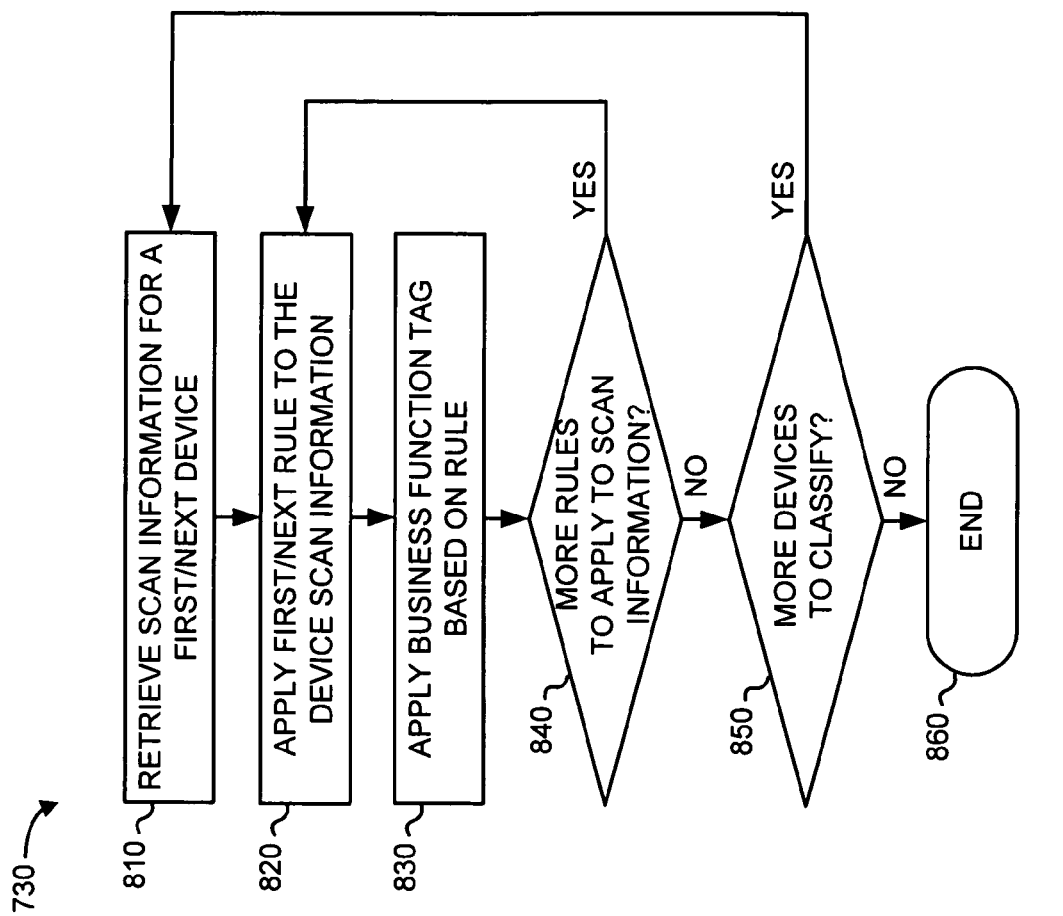

DEVICE CLASSIFICATION SYSTEM

BACKGROUND INFORMATION

Understanding and managing devices (e.g., servers, routers, gateways, personal computers, printers, etc.) within large networks can present a challenge for network administrators. Varieties of automated tools exist to assist administrators by gathering device information within the network and reporting the gathered information. These tools typically provide information such as a list of devices on the network, the IP address, the device domain name system (DNS) or NetBios name, and other technical configuration details. Unfortunately these tools fail to provide a higher level picture of what is the business importance of devices that the tool has assessed. Administrators are instead presented with a large amount of information to sort through with no effective way to manage or prioritize it. Administrators may be required to manually input additional information to better classify the devices. Furthermore, the tools may receive inaccurate, incomplete and/or poor technical information that leads to uninformative reports and/or false positives (i.e., too many devices may be marked as highly critical).

BRIEF DESCRIPTION OF THE DRAWINGS

FIG. 4 depicts a portion of an exemplary data structure for storing device information that may be used by the device classification system of FIG. 1;

FIG. 6 provides an exemplary rule that may be implemented by the device classification system of FIG. 1;

FIG. 8 provides a flow chart of an exemplary process that may be performed to determine a business function of a device in a network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may automatically determine business functions and criticality of a device on an IP network based upon the results of a device discovery tool. The systems and/or methods may process the details of how each device is configured and then apply a set of logical rules (or other decision techniques, such classical artificial intelligence techniques or other classification systems) to determine one or more business functions of the device, such as email server, database server, desktop/Laptop, router, etc. Based on the determined business functions of the device, the device can be automatically assigned a criticality score using core information security standards (e.g., confidentiality, integrity, and availability (or the "CIA triad"). Thus, the systems and/or methods described herein may automatically classify each device in a network without requiring prior or specialized knowledge of the network or devices being accessed.

As used herein, the term "device" may refer to any electronic device that is operatively connected to a computer network. As used herein, the term "business function" may refer to the function of a device on the network in relation to how the device is used in the network, or, in other words, the purpose(s) the device serves to the organization. For example, devices with similar hardware may have different the business functions, such as an email server, a web server, or a domain name system (DNS) server.

Core principles of information security are commonly recognized as confidentiality, integrity, and availability (sometimes called the "CIA triad"). The principle of confidentiality may include preventing disclosure of information to unauthorized individuals or systems. Integrity may refer to the assurance that data cannot be modified without authorization. Availability may refer to the ability of authorized individuals or systems to access data when required/desired. The CIA triad may provide a meaningful measure of assessing criticality for network devices tied to particular business functions.

Figure 1:
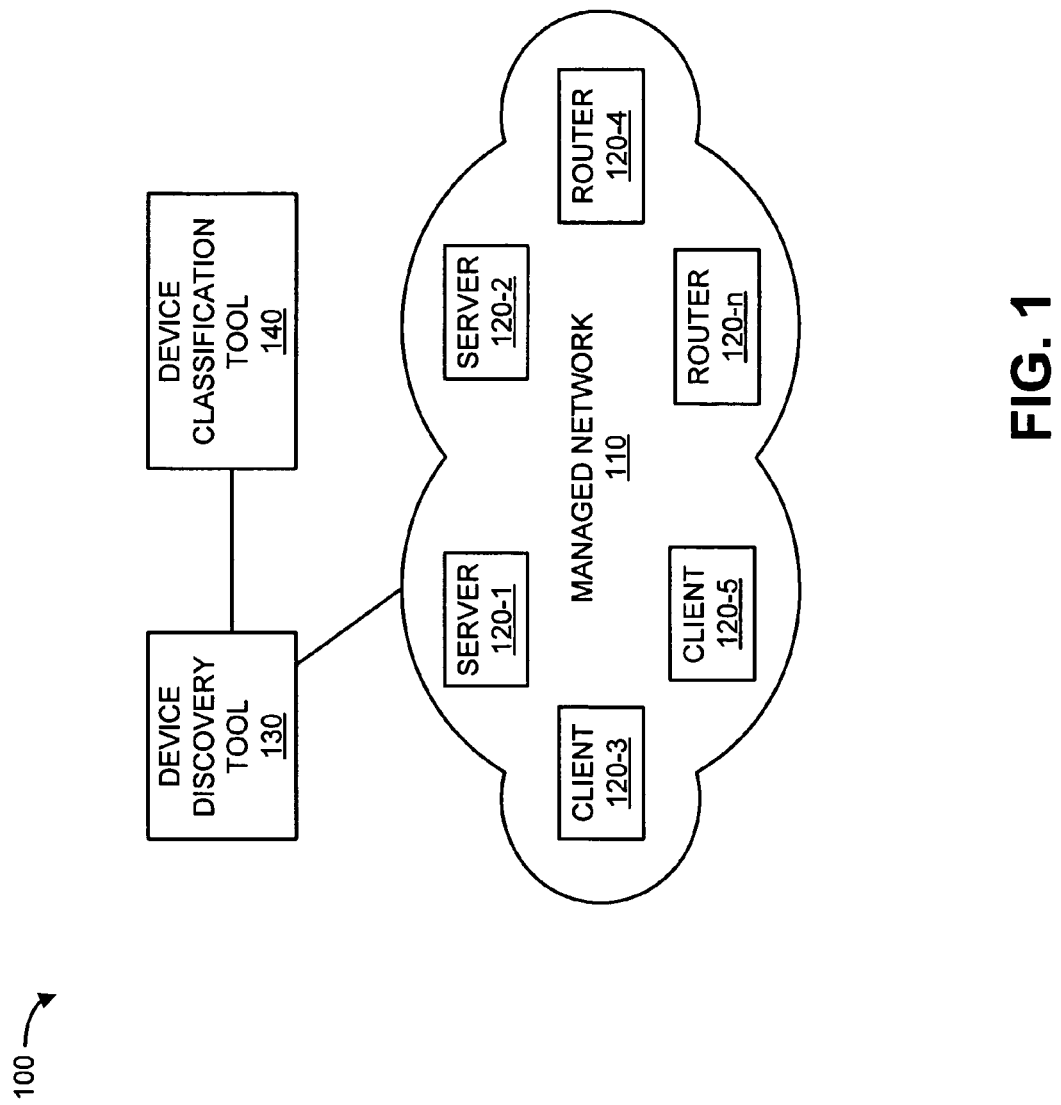
FIG. 1 depicts an exemplary network in which systems and methods described herein may be implemented.

FIG. 1 is a block diagram of an exemplary network 100 in which systems and/or methods consistent with the invention may be implemented. Network 100 may include a managed network 110 that includes multiple devices 120-1, 120-2, 120-3, 120-4, 120-5, ... 120-n (referred to herein collectively as "devices 120" and generically as "device 120"), a device discovery tool 130, and a device classification system 140. The exemplary configuration illustrated in FIG. 1 is provided for simplicity. In practice, network 100 may contain fewer, different, differently-arranged, or additional functional components than depicted in FIG. 1. Also, in some instances, one or more of the components of network 100 may perform one or more functions described as being performed by another one or more of the components of network 100.

Network 110 may include one or more wired and/or wireless networks that are capable of receiving and transmitting data and/or signals. For example, network 110 may include one or more intranet, a local area network (LAN), a wide area network (WAN), or another type of managed network. Network 110 may include a number of network devices 120, such as servers, clients, routers, gateways, switches, networked peripheral devices (e.g., printers, scanners, etc.), and/or a variety of other devices that may be included in a typical network. For example, referring to FIG. 1, network 110 may include devices 120 acting as servers (e.g., servers 120-1, 120-2), clients (e.g., clients 120-3, 120-5) and routers (routers 120-4, 120-n). Network 110 may also include software programs and/or network interfaces provided by or executed by one of the network devices within network 110.

Clients 120-3, 120-5 may each include a client device, such as a computer or another type of computation or communication device, a thread or process running on one of these devices, and/or an object executable by one of these devices. In one implementation, clients 120-3, 120-5 may each include a personal computer, a laptop computer, a workstation, a wireless device (e.g., a cellular telephone, a personal digital assistant (PDA), etc.), a set-top box that provides network access, an Internet Protocol (IP) Multimedia Subsystem (IMS) client, and/or any other type of device that may interact with another device in network 110. Clients 120-3, 120-5 may connect to network 110 via wired and/or wireless connections. Clients 120-3, 120-5 may also represent users outside a company that may access servers 120-1, 120-2.

Servers 120-1, 120-2 include a server device, such as a computer or another type of computation or communication device, a thread or process running on one of these devices, and/or an object executable by one of these devices. In an exemplary implementation, servers 120-1, 120-2 may receive data and/or information identifying data and may provide data to clients (e.g., clients 120-3, 120-5) based on specified communication handling procedures specified by, for example, the client or a network administrator. Servers 120-1, 120-2 may also run programs accessible to each of the users represented by nodes 120-3, 120-5.

Device discovery tool 130 may include a tool that gathers device configuration information from devices within network 110. For example, a device discovery tool 130 may include a vulnerability scanner, a network sniffer, an intrusion detection system, an intrusion prevention system, on-host asset discovery tools, network traffic analyzers, etc. Device discovery tool 130 may be passive or active, on-host or on-network. In one implementation, device discovery tool 130 may include one or more scanners used to detect anomalies in network devices. For example, device discovery tool 130 may establish connections to devices in network 110 and query each of the devices for applications, vulnerabilities, etc. Device discovery tool 130 may identify attributes of devices within network 110, such as the network the device is on, the operating system of the device, the applications on the device, and services and ports on the device, the vulnerabilities on the device, and configuration information from the device. As a particular example of vulnerability scan, device discovery tool 130 may include a device that scans a server for open ports that may be infiltrated by a hacker. Exemplary device discovery tools may include software-based tools, such as products by nCircle Network Security, Qualys, Tenable Network Security.

Device classification tool 140 may include one or more computing devices/platforms associated with classifying network devices in network 100. For example, device classification tool 140 may receive data from device discovery tool 130 that facilitates the identification of business functions for devices 120 in network 110. In alternative implementations, the functions performed by device discovery tool 130 may be performed by device classification tool 140. In each case, device classification tool 140 may perform a device classification based on a business function of each device and may provide the device classification information to a user.

In implementations described herein, device classification tool 140 may retrieve device information from device discovery tool 130 and examine the device information to identify one or more business function for each device. Device classification tool 140 may identify the business functions of devices 120 (e.g., servers 120-1, 120-2; clients 120-3, 120-5; routers 120-4, 120-n; etc.) using the device information. By using the determined business functions and the type of network incorporating the devices, device classification tool 140 may calculate a criticality rating for each of the devices in network 110. For example, assume server 120-1 is an email server and node 110-1 is a laptop computer. Both the email sever and the laptop computer serve business functions for an organization, with the business function of the email server being vastly different than the business function of the laptop computer. The email server may provide email services to hundreds of users and is likely to be highly critical, while the laptop computer is likely to serve a single user.

Device classification tool 140 may associate appropriate business function tags with each device. In one implementation, the business function tags may be used to determine a composite CIA score. In another implementation, the business function tags may be used as input to set or calculate risk and/or other attributes of a device without requiring user interaction.

Although FIG. 1 shows exemplary components of network 100, in other implementations, network 100 may contain fewer, additional, different, or differently-arranged components than depicted in FIG. 1. For example, in one implementation, device discovery tool 130 and/or device classification tool 140 may be located within network 110. In still other implementations, one or more components of network 100 may perform one or more other tasks described as being performed by one or more other components of network 100.

Figure 2:
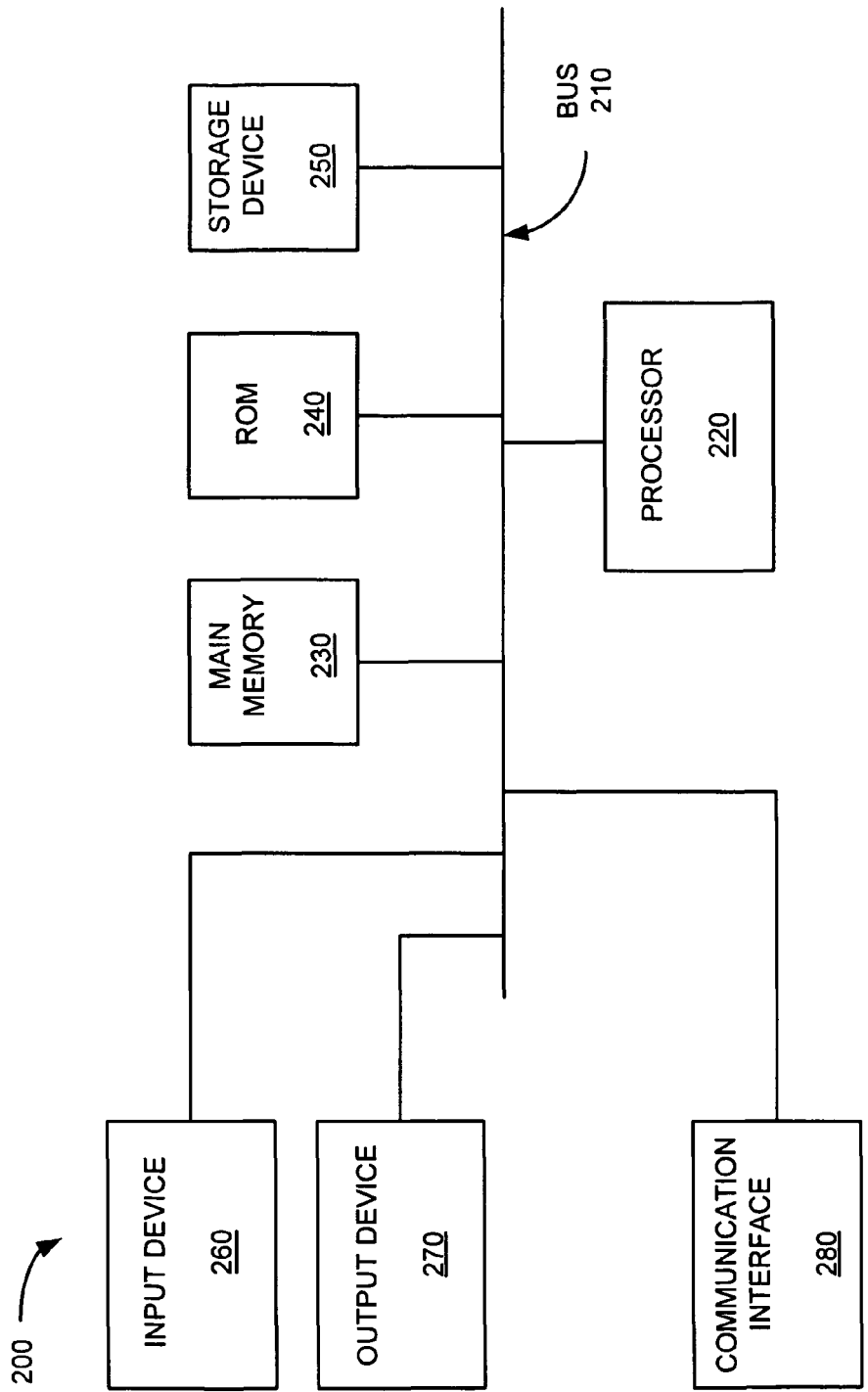
FIG. 2 illustrates exemplary components of the device classification system of FIG. 1.

FIG. 2 is an exemplary diagram of a device 200 that may correspond to device discovery tool 130, device classification tool 140, and/or certain devices within network 110. As illustrated, device 200 may include a bus 210, a processor 220, a main memory 230, a ROM 240, a storage device 250, an input device 260, an output device 270, and a communication interface 280.

Bus 210 may include conductors or a pathway that permit communication among the components of device 200. Processor 220 may include a processor(s), a microprocessor(s), or other types of processing devices that interpret and execute instructions. Main memory 230 may include one or more random access memories (RAMs) or another type of dynamic storage device that may store information and instructions for execution by processor 220. ROM 240 may include one or more ROM devices or another type of static storage device that may store static information and/or instructions for use by processor 220. Storage device 250 may include one or more magnetic and/or optical recording media and their corresponding drives.

Input device 260 may include one or more mechanisms that permit a user to input information to device 200, such as a keyboard, a key pad, a button, a touch screen, a touch pad, a mouse, a pen, voice recognition and/or biometric mechanisms, etc. Output device 270 may include one or more mechanisms that output information to the user, including a display, a printer, a speaker, a light emitting diode, etc. Communication interface 280 may include any transceiver-like mechanism that enables device 200 to communicate with other devices and/or systems. For example, communication interface 280 may include mechanisms for communicating with another device or system via a network, such as network 110.

As described herein, device 200 may perform certain operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
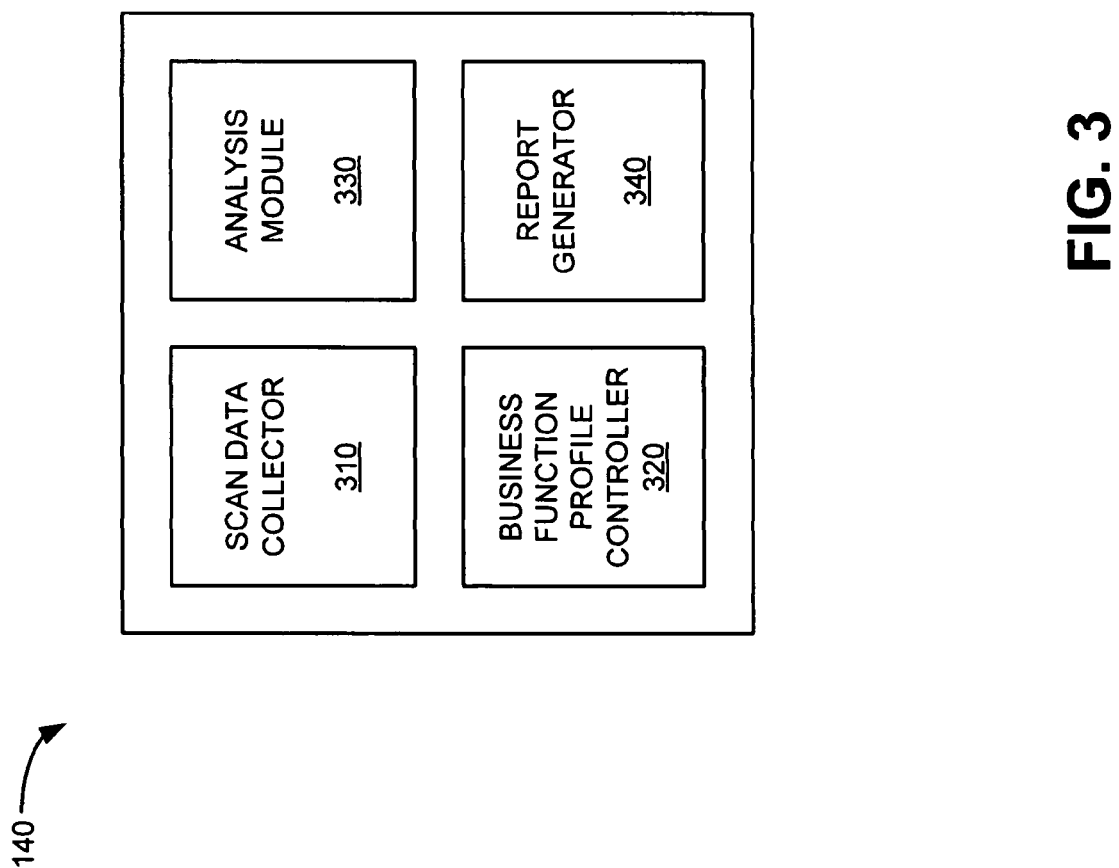
FIG. 3 depicts a diagram of exemplary functional components of the device classification system of FIG. 1.

FIG. 3 depicts a diagram of exemplary functional components of device classification tool 140. As shown in FIG. 3, device classification tool 140 may include scan data collector 310, business function profile controller 320, analysis module 330, and report generator 340. In one implementation, scan data collector 310, business function profile controller 320, analysis module 330, and report generator 340 may be implemented within processor 220 and/or memory 230 of device classification tool 140.

Scan data collector 310 may include an adaptive interface to retrieve scan information for the devices in the network to be analyzed (e.g., network 110). For example, scan data collector 310 may solicit and retrieve scan data from device discovery tool 130. Scan data collector 310 may retrieve real-time information or stored information from device discovery tool. In another implementation, scan data collector may solicit and retrieve scan information from a source other than scan data collector 310. For example, scan data collector 310 may simply receive stored device information from a previously conducted vulnerability scan, from a manually entered data set, or from another process. Scan data collector 310 may identify and categorize attributes associated with each device, such as attributes of the device itself (e.g., operating systems, applications, ports used, open ports, etc.), the network the device is on, surrounding devices, other devices with which the device may perform network connections, and/or the type of scan.

FIG. 4 depicts a portion of an exemplary data structure 400 that may be used by scan data collector 310. As illustrated in FIG. 4, data structure 400 may include a variety of information associated with a particular device in network 110. For example, data structure 400 may include an device IP address field 410, an operating system field 420, an application information field 430, an interface field 440, a variety of records or entries 450 associated with fields 430-440, and a profile tags field 460. In one implementation, device IP address field 410, operating system field 420, the entries 450 associated with application information field 430, and interface field 440 may be populated using data from device discovery tool 130, while profile tags field 460 may be populated by device classification tool 140.

Device IP address field 410 may include the unique IP address (e.g., "192.168.10.77") of the device which data structure 400 represents. Operating system field 420 may include the operating system or systems (e.g., "Cisco") being used by the device. For example, operating systems may include router operating systems (e.g., Cisco, Juniper, etc.), PC operating systems (Windows, Mac, Linux, Unix, Solaris, etc.), and/or other operating systems. Application information field 430 may include application names (e.g., "Cisco SSH," "Cisco Telnet," HTTP Server," SSLv3") application types (e.g., "SSH," "Telnet," unknown ("?")) and/or ports (e.g., "TCP 22", "TCP 23", "TCP 443") associated with the application for the device associated with IP address 410. Interface field 440 may include interface descriptions (e.g., "Telnet available," "SSH protocol available," "HTTP available," SHHv1 protocol available) and interface ports (e.g., "TCP 23", "TCP 22", "TCP 443") for the device associated with IP address 410.

Profile tags field 460 may include one or more profile tags as determined by device classification tool 140 (e.g., analysis module 330 described below). Profile tags may identify a business function (e.g., email server, database, router, firewall, etc.) associated with the device identified within data structure 400. Thus, as shown in FIG. 4, profile tags field 460 may be empty or unknown when data structure 400 is initially created for a device within network 110. As described further below, one or more profile tags may be added to profile tags field 460 as device classification tool 140 determines business functions for the device associated with data structure 400. Exemplary profile tags may correspond to, for example, business functions identified in profile field 510 described with regard to FIG. 5 below.

Although FIG. 4 shows exemplary information that may be provided in data structure 400, in other implementations, data structure 400 may contain less, different, differently-arranged, or additional information than depicted in FIG. 4. For example, data structure may also include other information derived as a by-product of performing a scan, such as the IP address range of targeted devices and the relationship of the network to a customer requesting the scan (e.g., internal LAN, DMZ, externally facing network, etc.). While one data structure 400 for a single device in network 110 is shown in FIG. 4, implementations herein may include multiple data structures corresponding to multiple devices within network 110.

Returning to FIG. 3, business function profile controller 320 may include hardware or a combination of hardware and software to receive business function definitions and scores. In an exemplary implementation, the number of business functions may be limited to a manageable size (e.g., 10-30) to allow for a meaningful presentation to a network administrator or other user of a device classification system. Exemplary business functions definitions may include: database server, wireless access point (AP), printer, workstation (laptop/desktop), application server, virtual private network (VPN) entry point, email server, exchange server, media server, firewall, router, DNS server, source code repository, and/or Web server.

Figure 5:
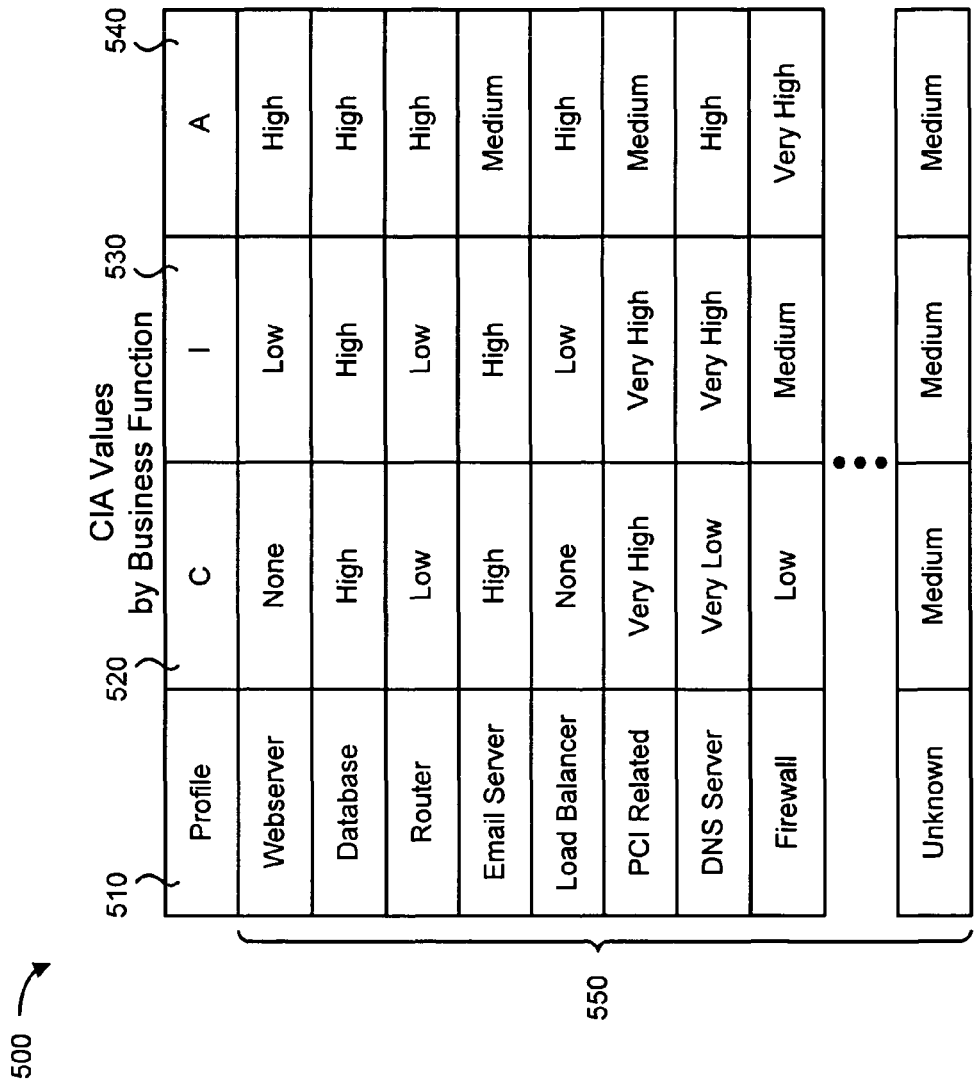
FIG. 5 depicts a portion of an exemplary data structure for storing business function CIA values.

FIG. 5 depicts a portion of an exemplary data structure 500 for business function CIA values. As illustrated in FIG. 5, data structure 500 may include a variety of information associating business functions with CIA triad values. For example, data structure 500 may include a profile name field 510, a confidentiality ("C") grade field 520, an integrity ("I") grade field 530, an availability ("A") grade field 540, and a variety of records or entries 550 associated with fields 510-540.

Profile name field 510 may include a name associated with the business function being assessed in confidentiality grade field 520, integrity grade field 530, and availability grade field 540. In one implementation, profile names may be labeled in a manner easily associated with a known network function. Confidentiality grade field 520, integrity grade field 530, and availability grade field 540 may include a quantitative (e.g., 1-10) and/or qualitative (e.g., low, medium, high, etc.) grade for the significance of confidentiality, integrity, and availability to each respective profile name. For example, as shown in FIG. 5, the business function profile "Webserver" may have no confidentiality criticality score ("none"), a low integrity criticality score ("low"), and a high availability criticality score ("high"). In contrast, also as shown in FIG. 5, the business function profile "Email Server" may have a high confidentiality criticality score ("high"), a high integrity criticality score ("high"), and a moderate availability criticality score ("medium").

Although FIG. 5 shows exemplary information that may be provided in data structure 500, in other implementations, data structure 500 may contain less, different, differently-arranged, or additional information than depicted in FIG. 5.

Returning again to FIG. 3, analysis module 330 may include hardware or a combination of hardware and software that stores and applies rules to determine one or more business functions of a device. For example, analysis module 330 may retrieve device attributes from scan data collector 310 and apply one or more rule against each attribute to determine a business function. If an applied rule successfully identifies a business function, analysis module 330 may tag the device accordingly. To identify a business function, analysis module 330 may one or more analysis processes, such as, for example, using a rules engine, a decision tree, an artificial intelligence database, online analytical processing (OLAP), and/or a statistical or heuristic assessment.

In one implementation, analysis module 330 may include a set of rules (e.g., a rules engine) that incorporates a unique rule for each potential business function. Analysis module 330 may apply rules in order against each device that was identified by scan data collector 310. The rules may include, for example, logic which requires the presence or absence of certain applications, ports, services, vulnerabilities, etc. to satisfy the rule criteria. In some implementations, rules may apply a process of elimination, ruling out what a device is not, rather then what the device is. Rules for each business function may be prepared and/or revised, for example, by a user (e.g., a subject matter expert). Rules may be updated and/or exchanged to accommodate changing technology and/or environments. Analysis module 330 may receive and apply updates to a single rule without requiring replacement of the entire set of rules.

FIG. 6 depicts an exemplary rule 600 that may be implemented by the analysis module 330 in device classification tool 140. Rule 600 may be used by analysis module 330 to identify if a device in network 110 is a web server. In one implementation, analysis module 330 may apply rule 600 to data associated with a particular device (e.g., data structure 400). As shown in FIG. 6, rule 600 may instruct, in section 610, analysis module 330 to search generally for indications of particular classes/versions of applications (e.g., "Microsoft IIS HTTP," "Microsoft IIS HTTP 5.x," "Microsoft IIS HTTP4.x,"). Section 620 may instruct analysis module 330 to search for indications of a particular type of application on a particular port (e.g., "Apache HTTP" on port "tcp:80" or "tcp:443"; and "SSL" on port "tcp 443"). Section 630 may instruct analysis module 330 to search for indications of any application name including variations of certain Web server software (e.g., "Netscape/iPlanet/SunONE/NetWare Enterprise and Netscape FastTrack HTTP).

Section 640 may instruct analysis module 330 to apply a process of elimination of non-compatible and/or mutually-exclusive business function profiles. For example, the "webserver" profile may be mutually-exclusive from a printer, a router, a firewall, a workstation, or an exchange server. Thus, if data structure 400 includes (e.g., in profile tags field 460) a particular tag (e.g., "Printer," "Router," "Firewall," "Desktop_Laptop_Workstation," and/or "Exchange_Secure_Mail"), analysis module 330 may determine that the device associated with data structure 400 is not a web server. If application of sections 610, 620, 630 and 640 indicate that the data associated with the device is a web server, then section 650 may instruct analysis module 330 to add a tag (e.g., "webserver") to data structure 400 (e.g., in profile tags field 460).

Although FIG. 6 shows exemplary information that may be provided in rule 600, in other implementations, rule 600 may contain less, different, differently-arranged, or additional information than depicted in FIG. 6.

Referring again to FIG. 3, report generator 340 may include hardware or a combination of hardware and software to generate reports that show the business function of the scanned devices within the network (e.g., network 110) and the criticality rating for each device. Report generator 340 may provide reports in a variety of formats to allow a network and/or system administrator better insights into what devices are connected to their network and the uses of those devices. In one implementation, report generator 340 may provide results in the form of a table or spreadsheet that may allow devices to be sorted based on business function or one or more criticality score component (e.g., confidentiality, integrity, availability scores from the CIA triad). In another implementation, report generator 340 may provide results in a machine-readable format that can be used in risk equations and other formulas that allow system administrators, for example, to use this information to prioritize remediation efforts and response to security issues.

Although FIG. 3 shows exemplary functional components of device classification tool 140, in other implementations, device classification tool 140 may contain fewer, different, differently-arranged, or additional functional components than depicted in FIG. 3. In still other implementations, one or more functional components of device classification tool 140 may perform one or more other tasks described as being performed by one or more other functional components of device classification tool 140.

Figure 7:
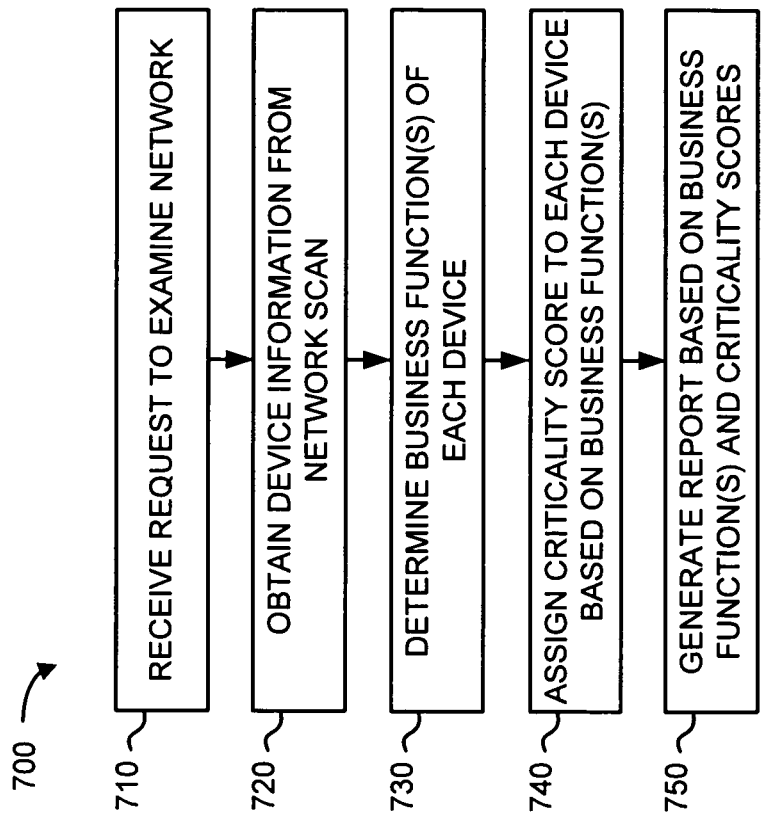
FIG. 7 provides a flow chart of an exemplary process that may be performed to analyze devices in a network.

FIG. 7 provides a flow chart of exemplary process 700 that may be performed to analyze devices in a network. In one implementation, process 700 may be performed by device classification tool 140. In another implementation, some or all of process 700 may be performed by another device or group of devices, including or excluding device classification tool 140.

As illustrated in FIG. 7, process 700 may begin with receiving a request to examine a network (block 710). For example, device classification tool 140 may receive a request to classify devices within network 110.

Device information may be obtained from a network scan (block 720). For example, device classification tool 140 (e.g., scan data collector 310) may retrieve data from a network scan performed by device discover tool 140. The data from the network scan may include, for example, data from a vulnerability scan, passive network sniffing data, network traffic flow data, etc.

One or more business functions of each device may be determined (block 730). For example, device classification tool 140 may identify one or more business functions (e.g., business functions included in profile field 510 of data structure 500) for each device identified in the device information. In one implementation, device classification tool 140 may apply a set of specialized rules to determine a business function of each device. The rules can be updated as changes occur to device configurations and other technology. In other implementations, device classification tool 140 may apply another appropriate analysis process. An exemplary implementation of determining business functions of devices is described further with respect to FIG. 8 below.

A criticality score may be assigned to each device based on the determined business functions (block 740). For example, device classification tool 140 (e.g., analysis module 330) may apply a score based on the business function associated with a device and the CIA triad values provided in data structure 500.

A report may be generated based on the business functions and criticality scores (block 750). For example, device classification tool 140 (e.g., report generator 340) may generate a report that shows the business function of the devices within the network (e.g., network 110) and the criticality rating for each device. Device classification tool 140 may provide reports in a variety of formats to allow a network and/or system administrator to easily recognize what devices are connected to their network and the uses of those devices.

FIG. 8 provides a flow chart of an exemplary process that may be performed to determine a business function of a device in a network (e.g., block 730 of FIG. 7). In one implementation, process 800 may be performed by functional components within device classification tool 140. In another implementation, some or all of process 800 may be performed by another device or group of devices, including or excluding device classification tool 140.

As illustrated in FIG. 8, process 800 may begin with retrieving scan information for a first device (block 810). For example, analysis module 330 may identify a first device (e.g., as indicated by a unique IP address) from the network scan information obtained by scan data collector.

A first/next rule may be applied to the device information (block 820). For example, analysis module 330 may apply a first rule in a set of rules to determine if a business function associated with the first rule applies to the device information. The set of rules may include multiple rules sufficient to analyze the device against each business function (e.g., each business function included in data structure 500). The set of rules may include a logical sequence and/or parallel structure such that some rules may be applied based on application/tagging of a business function by prior rules. For example, as shown in section 640 of exemplary rule 600, determination of some business functions may be based on the existence (or non-existence) of profile tags for other business functions.

A business function tag may be applied based on the rule (block 830). For example, analysis module 330 may (if applicable) add a profile tag to profile tags field 460, based on the result of applying the rule to the device information. The profile tag may correspond to the business function identified by the rule, such as Database server, Wireless AP, Printer, Workstation (Laptop/Desktop), Application Server, VPN Entry Point, Email Server, Exchange Server, Media Server, Firewall, Router, DNS Server, Source Code Repository, Webserver, etc.

It may be determined if there are more rules to apply to the scan information for the device (block 840). For example, analysis module 330 may determine whether other rules in a logical or parallel rule sequence remain for the device. If there are more rules to apply to the scan information for the device (block 840—YES), the next rule may be applied to the device scan information (block 820). Analysis module may continue to process scan information for the particular device until all rules have been applied for that device.

If there are no more rules to apply to the scan information for the device (block 840—NO), it may be determined if there are more devices to classify (block 850). For example, analysis module 330 may determine if there is scan information for other devices within network 110 that remain to be classified. If there are more devices to classify (block 850—YES), scan information for the next device may be retrieved (block 810). If there are no more devices to classify (block 850—NO), the classification of the devices in the network may be deemed complete (block 860).

Systems and/or methods described herein may include obtaining device information for devices within a network. The device information may include data from vulnerability scanners, network sniffers, intrusion detection system, and the like. A business function for each of the devices may be determined. In one implementation, the business function may be determined by applying, to device information for each device, a set of rules specific to each potential business function. The systems and/or methods may assign a criticality score to each of the devices based on the determined business function and generate a report for the devices including the determined business function and the assigned criticality score.

The foregoing description provides illustration and description, but is not intended to be exhaustive or to limit the embodiments to the precise form disclosed. Modifications and variations are possible in light of the above teachings or may be acquired from practice of systems and methods disclosed herein.

Also, while series of blocks have been described with regard to FIGS. 7-8, the order of the blocks may differ in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer device-implemented method, comprising:
obtaining, by the computer device, device information for a plurality of devices within a network; determining, by the computer device, a business function for one of the plurality of devices by applying a rule, of a set of logical rules, associated with the business function, to a portion of the device information associated with the one of the plurality of devices,
    the set of logical rules including rules for a group of business functions,
    the rules including the rule,
    the group of business functions including the business function, and
    the business function indicating at least one of how the one of the plurality of devices is used in the network or a purpose the one of the plurality of devices serves to an organization associated with the network;
assigning, by the computer device, a criticality score to the one of the plurality of devices based on the business function; and
generating, by the computer device, a report for the one of the plurality of devices based on the business function and the criticality score, the report including information identifying the business function and the criticality score.

2. The computer device-implemented method of claim 1, where the device information is obtained from a network scanner operatively connected to the network.

3. The computer device-implemented method of claim 2, where the network scanner is:
   a vulnerability scanner;
   a network sniffer;
   an intrusion detection system;
   an intrusion prevention system;
   an on-host asset discovery tool; or
   a network traffic analyzer.

4. The computer device-implemented method of claim 1, where the criticality score includes a confidentiality component, an integrity component, and an availability component.

5. The computer device-implemented method of claim 1, where the business function is selected from a group of pre-defined business functions.

6. The computer device-implemented method of claim 1, where the business function is associated with the criticality score.

7. The computer device-implemented method of claim 1, where the group of business functions includes two or more of:
   a database server,
   a wireless access point (AP),
   a printer,
   a workstation,
   an application server,
   a VPN entry point,
   an email server,
   an exchange server,
   a media server,
   a firewall,
   a router,
   a DNS server,
   a source code repository, or
   a Web server.

8. A computing device comprising:
   a processor to:
      obtain information for a plurality of devices within a network,
         the information for the plurality of devices including particular information associated with a particular device of the plurality of devices,
      determine a business function for the particular device by applying a rule, of a set of logical rules, associated with the business function, to the particular information associated with the particular device,
         the set of logical rules including rules for a group of business functions,
         the rules including the rule,
         the group of business functions including the business function, and
         the business function indicating at least one of how the particular device is used in the network or a purpose the particular device serves to an organization associated with the network,
      assign a criticality score to the particular device based on the business function, and
      generate a report for the plurality of devices based on the business function and the criticality score,
         the report including information identifying the business function and the criticality score.

9. The computing device of claim 8, where the information for the plurality of devices is obtained from a network scanner operatively connected to the network and to the computing device.

10. The computing device of claim 8, where the network scanner is:
    a vulnerability scanner;
    a network sniffer;
    an intrusion detection system;
    an intrusion prevention system;
    an on-host asset discovery tool; or
    a network traffic analyzer.

11. The computing device of claim 8, where the criticality score includes a confidentiality component, an integrity component, and an availability component.

12. The computing device of claim 8,
    where each business function, in the group of business functions, is associated with a particular criticality score.

13. The computing device of claim 8, where, when generating the report, the processor is to:
    generate the report in a machine-readable format that allows the plurality of devices to be sorted based on one of:
       the business function, or
       a component of the criticality score.

14. The computing device of claim 8, where, when applying the rule of the set of rules, the processor is to:
    apply the rule after applying other rules, of the set of logical rules, to the particular information associated with the particular device.

15. The computing device of claim 8, where the processor is further to:
    receive updates for the rule, and
    update the rule based on the received updates.

16. The computing device of claim 8, where, when determining the business function, the processor is to use:
    a decision tree,
    an artificial intelligence database,
    online analytical processing (OLAP),
    a statistical assessment, or
    a heuristic assessment.

17. The computing device of claim 8, where the particular information specifies a particular type of application and a particular port on the particular device.

18. A non-transitory computer-readable medium storing instructions, the instructions comprising:
    one or more instructions that, when executed by at least one processor, cause the at least one processor to:
       receive information for a device within a network;
       determine a business function of the device by applying a rule, of a set of logical rules, associated with the business function, to the information for the device,
          the set of logical rules including rules for a group of business functions,
          the rules including the rule,
          the group of business functions including the business function, and
          the business function indicating at least one of how the device is used in the network or a purpose the device serves to an organization associated with the network;
       assign a criticality score to the device based on the business function; and
       generate a report for the device based on the business function and the criticality score, the report including information identifying the business function and the criticality score.

19. The non-transitory computer-readable medium of claim 18, where the information specifies one or more operating systems that are associated with the device.

20. The non-transitory computer-readable medium of claim 18, where the rule applies a process of elimination to determine the business function by ruling out one or more other business functions.

21. The non-transitory computer-readable medium of claim 18, where the information for the device specifies a particular type of application and a particular port, associated with the particular type of application, on the device.

\* \* \* \* \*